(12) United States Patent
Ueda et al.

(10) Patent No.: US 7,855,795 B2
(45) Date of Patent: Dec. 21, 2010

(54) TRANSMISSION APPARATUS AND TRANSMISSION METHOD

(75) Inventors: Suehiro Ueda, Shiki-gun (JP); Syoichiro Yoshiura, Ikoma-gun (JP); Tsutomu Yoshimoto, Yamatotakada (JP)

(73) Assignee: Sharp Kabushiki Kaisha, Osaka (JP)

( * ) Notice: Subject to any disclaimer, the term of this patent is extended or adjusted under 35 U.S.C. 154(b) by 986 days.

(21) Appl. No.: 11/704,394

(22) Filed: Feb. 9, 2007

(65) Prior Publication Data
US 2007/0206754 A1 Sep. 6, 2007

(30) Foreign Application Priority Data
Feb. 21, 2006 (JP) ............... 2006-044279

(51) Int. Cl.
*H04N 1/00* (2006.01)
*G06K 15/00* (2006.01)
(52) U.S. Cl. ................ 358/1.14; 358/1.15; 358/1.16; 358/400
(58) Field of Classification Search ............ 358/1.13, 358/1.14, 1.15, 1.16, 1.17, 1.18, 1.9, 2.1, 358/400, 401, 403, 444, 443, 448; 705/1, 705/9, 59, 104.1; 348/373, 335, 207; 396/312; 400/76, 61
See application file for complete search history.

(56) References Cited

U.S. PATENT DOCUMENTS

| 5,909,248 | A * | 6/1999 | Stephenson ................ 348/373 |
| 2001/0049666 | A1 * | 12/2001 | Prakken et al. ................ 705/59 |
| 2002/0021359 | A1 | 2/2002 | Okamoto |
| 2004/0133516 | A1 * | 7/2004 | Buchanan et al. ............ 705/42 |
| 2005/0097171 | A1 | 5/2005 | Hikichi |
| 2006/0001898 | A1 | 1/2006 | Maeshima et al. |
| 2006/0167709 | A1 * | 7/2006 | Jung et al. ..................... 705/1 |
| 2007/0070410 | A1 * | 3/2007 | Suzuki et al. .............. 358/1.15 |

FOREIGN PATENT DOCUMENTS

| JP | 01-245639 | | 9/1989 |
| JP | 3-128356 | | 12/1991 |
| JP | 2000-134305 | | 5/2000 |
| JP | 2000-341436 | | 12/2000 |
| JP | 2002-016865 | | 1/2002 |
| JP | 2002-041413 | | 2/2002 |
| JP | 2002354271 | * | 12/2002 |
| JP | 2003251899 | * | 9/2003 |
| JP | 2004-112455 A | | 4/2004 |
| JP | 2005-158038 | | 6/2005 |
| JP | 2006-015625 A | | 1/2006 |

* cited by examiner

*Primary Examiner*—Jerome Grant, II
(74) *Attorney, Agent, or Firm*—Edwards Angell Palmer & Dodge LLP; David G. Conlin; David A. Tucker

(57) ABSTRACT

The present invention provides a transmission apparatus and method which realize a redial function and prevents the leakage of transmission information to the outside by inhibiting the display of the information including a destination to which retransmission is made, when it is determined that a predetermined condition is satisfied, whereby security can be enhanced.

When the transmission of image data is not completed, a control section performs a retransmission process for transmitting again the image data to the same destination with the use of the redial function, and counts the number of times of the transmission. The control section determines whether the number of times of the transmission is greater than a predetermined value or not. When the number of times of the transmission is greater than the predetermined value, the control section reports a transmission error and deletes the information including the destination.

9 Claims, 15 Drawing Sheets

FIG. 7

| DESTIN. | TIME | PAGES | | STATUS |
|---|---|---|---|---|
| 1 /////// | 14:25 12/09 | A4 | 15 | DONE |
| 2 /////// | 14:27 12/09 | A4 | 1 | DONE |
| 3 /////// | 14:40 12/09 | A4 | 2 | DONE |
| 4 /////// | 14:47 12/09 | A4 | 13 | DONE |

STANDING-BY ⇔ COMPLETED

1/2 ⇦ ⇨

PRINT | E-MAIL | FAX | FAX

```
ADR./ONE-TOUCH                [CANCEL]  [ OK ]
FAX TRANS.  GROUP 1

[ NAME ]   HEAD XX (HEAD OFF.)   BCD CO., LTD.
           CHIEF XX (OSAKA)
```

TRANSMISSION APPARATUS AND TRANSMISSION METHOD

CROSS-REFERENCE OF RELATED APPLICATION

This Nonprovisional Application claims priority under 35 U.S.C. §119(a) on Patent Application No. 2006-044279 in Japan on Feb. 21, 2006, the entire contents of which are hereby incorporated by reference.

BACKGROUND OF THE INVENTION

1. Field of the Invention

The present invention relates to a transmission apparatus and transmission method having a redial function for making a call to the same destination when data transmission is not completed.

2. Description of the Prior Arts

With increased speed for processing information or increased amount of information represented by Internet, a digital multifunctional machine or facsimile device provided with a scanner function, printer function, facsimile function and mail transmission function has recently been connected to the other digital multifunctional machine or information communication terminal such as a personal computer installed at a remote place through network or communication line, so as to be shared by many users.

The digital multifunctional machine or facsimile device described above has a redial function, from the viewpoint of enhancing operability of a user, in which, when the other party (destination) is busy or when communication to the other party cannot be established because of some problems on the communication in the event that image data obtained by a scanner function or by an external personal computer is to be transmitted to a remote place with a facsimile communication, this image data is again transmitted to the same party.

As for the redial function, Japanese Patent Application Laid-Open No. H01-245639 and Japanese Utility Model Application Laid-Open No. H03-128356 disclose a telephone device that erases dial data redialed with the condition of on-hook in order to prevent that the others can find the information about the other party from the dial data stored in a memory by a redial function.

There has also been proposed a communication terminal device that enhances operability for a transmission command in such a manner that, in the case of redial-over in which the communication cannot be established to the other party even if redial is done predetermined number of times, a transmission command for a redial-over is displayed so as to cause a user to recognize that there is a redial-over, and to cause a user to select whether he/she makes a retransmission or makes a deletion for the displayed transmission command (Japanese Patent Application Laid-Open No. 2000-341436).

Further, there has been proposed an image reading device that can simplify a transmission operation for an e-mail with an image in such a manner that, when an e-mail with an image is transmitted to the information of the destination instructed by an e-mail for instruction transmitted from a terminal, and the transmission is completed, in an image reading device connected to plural terminals through network, the e-mail for instruction is deleted in order not to need to manage the information of the destination at the image reading device (Japanese Patent Application Laid-Open No. 2002-41413).

BRIEF SUMMARY OF THE INVENTION

However, in the telephone device disclosed in Japanese Patent Application Laid-Open No. H01-245639 and Japanese Utility Model Application Laid-Open No. H03-128356, the dial data is deleted, so that the transmission record might be deleted in case where this is applied to, for example, a digital multifunctional machine. A digital multifunctional machine is shared by many users. Therefore, in order to manage the condition of the transmission operation of each user, it is necessary to record the transmission history or redial information. Accordingly, it has been demanded that information of the destination cannot be found by other users without deleting dial data.

In the communication terminal device disclosed in Japanese Patent Application Laid-Open No. 2000-341436, the operability such as retransmission or deletion for the transmission command of redial-over can be enhanced, but since the transmission information (e.g., information of the other party) stored as redial function is displayed as a list, there arises a security problem that the transmission information is unintentionally found by a third party.

In the image reading device disclosed in Japanese Patent Application Laid-Open No. 2002-41413, the e-mail for instruction including the address of the destination is deleted on the condition that the transmission is completed, but the redial function is not disclosed. Therefore, a transmission apparatus has been demanded that can prevent the transmission information stored as the redial function from being leaked to the outside.

The present invention is accomplished in view of the above circumstances, and aims to provide a transmission apparatus and transmission method that can enhance security in such a manner that, when it is determined that predetermined condition is satisfied, the display of transmission information including the destination to which the retransmission is made is inhibited, whereby the leakage of the transmission information to the outside is prevented while a redial function (retransmission) is made usable.

Another object of the present invention is to provide a transmission apparatus and transmission method that can further enhance security in such a manner that, when it is determined that a predetermined condition is satisfied, the retransmission is inhibited to thereby prevent the leakage of the transmission information to the outside.

Still another object of the present invention is to provide a transmission apparatus that determines that the condition is satisfied when the data transmission is completed, whereby the leakage of the transmission information to the outside after data is transmitted can be prevented.

Still another object of the present invention is to provide a transmission apparatus that determines that the condition is satisfied when a document from which data is obtained is removed from a document tray, whereby it can be prevented that the transmission information is found by a third party (other user, and the like) after a user removes the document from the document tray.

Still another object of the present invention is to provide a transmission apparatus that determines that the condition is satisfied when a man is away from the transmission apparatus, whereby it can be prevented that the transmission information is found by a third party after a user transmits data and then is away from the apparatus.

Still another object of the present invention is to provide a transmission apparatus that determines that the condition is satisfied when the number of times of retransmission exceeds a prescribed threshold value, whereby it can be prevented that the transmission information is found by a third party during the repeated retransmission process by limiting the number of times of the retransmission.

Still another object of the present invention is to provide a transmission apparatus that inhibits the display of transmission history and/or retransmission information on the basis of the destination, whereby the transmission information can be protected according to the degree of sensitiveness of the destination by setting beforehand the transmission information whose display can be inhibited according to the destination.

There is provided a transmission apparatus according to the present invention, comprising: a transmitter retransmitting data to a destination when data transmission is not completed; a storage storing information about the destination; a display displaying the information stored by the storage; and a controller determining whether or not a predetermined condition is satisfied, wherein the controller inhibits the display of the information by the display when it determines that the predetermined condition is satisfied.

There is provided a transmission apparatus according to the present invention, wherein the controller inhibits the retransmission by the transmitter when it determines that the predetermined condition is satisfied.

There is provided a transmission apparatus according to the present invention, wherein the controller determines that the condition is satisfied when data transmission is completed.

There is provided a transmission apparatus according to the present invention, further comprising: a document tray having a document for obtaining data placed thereon or discharged thereonto; and a sensor detecting whether or not a document is placed on the document tray; wherein the controller determines that the condition is satisfied when the document is removed from the document tray.

There is provided a transmission apparatus according to the present invention, further comprising: a sensor detecting whether or not a person is present at a vicinity of the transmission apparatus, wherein the controller determines that the condition is satisfied when a person is away from the transmission apparatus.

There is provided a transmission apparatus according to the present invention, wherein the controller counts the number of times of retransmission, and determines that the condition is satisfied when the number of times exceeds a prescribed threshold value.

There is provided a transmission apparatus according to the present invention, wherein the information is about a transmission history or a destination when retransmission is made, and the controller inhibits the display of the information according to the destination.

There is provided a transmission method according to the present invention for storing information relating to a destination, displaying the stored information, and retransmitting the data to the destination when data transmission is not completed, comprising steps of determining a predetermined condition; and inhibiting the display of the information when it is determined that the predetermined condition is satisfied.

There is provided a transmission method according to the present invention, further comprising a step of inhibiting the retransmission when it is determined that the predetermined condition is satisfied.

According to the present invention, transmission information (e.g., facsimile number of the destination, phone number, name of the destination, transmission date, content of transmission, etc.) relating to the destination is stored, the stored transmission information can be displayed, a redial function for retransmitting the data to the same destination in the case of the data transmission not being completed is provided, and when the determining means (controller) determines that the predetermined condition is satisfied, the display of the transmission information including the destination to which the data is retransmitted by retransmission means (e.g., redial function) is inhibited (e.g., the transmission information is stored but a user cannot find the transmission information). Accordingly, the redial function is usable, and the leakage of the transmission information to a third party (e.g., other user) is prevented. Further, since the transmission information is stored (is not completely deleted), an administrator can manage the used condition of the apparatus in accordance with the stored transmission information.

According to the present invention, when the determining means determines that the predetermined condition is satisfied, the retransmission by the retransmission means is inhibited. This prevents that a third party reads the stored transmission information by utilizing the redial function, for example.

According to the present invention, when the data transmission is completed, the determining means determines that the condition is satisfied. This makes it possible to display the transmission information when the data transmission is not completed, thereby achieving convenience for a user, and preventing the leakage of the transmission information to the outside after the completion of the data transmission.

According to the present invention, the detection sensor detects whether a document is removed from the document tray or not after the document is placed on the document tray or discharged from the document tray. When the document is removed from the document tray, the determining means determines that the condition is satisfied. Accordingly, when the document remains on the document tray, the transmission information can be displayed to thereby achieve convenience for a user, and after the document is removed from the document tray, it is prevented that the transmission information is found by a third party.

According to the present invention, the detection sensor detects that a man (e.g., user) is away from the transmission apparatus after it detects that the man is near the transmission apparatus. The determining means determines that the condition is satisfied when the man is away from the transmission apparatus. Accordingly, when the user is not away from the transmission apparatus, the transmission information can be displayed to thereby achieve convenience for a user, and after the user is away from the transmission apparatus, it is prevented that the transmission information is found by a third party.

According to the present invention, counting means (controller) counts the number of times of retransmission. When the number of times counted by the counting means exceeds the prescribed threshold value, the determining means determines that the condition is satisfied. Accordingly, when the number of times of the retransmission is within the prescribed number of times, the transmission information can be displayed to thereby achieve convenience for a user, and when the number of times of the retransmission exceeds the prescribed number of times, it is prevented that the transmission information is found by a third party.

According to the present invention, the transmission information is a transmission history (e.g., transmission information time-sequentially recorded such as facsimile number of the destination, phone number, name of the destination, transmission date, content of transmission, etc.) or retransmission information (e.g., transmission information for every destination in the event that the redial is made) when the retransmission is performed. Inhibiting means (controller) inhibits the display of only the transmission history, only the retransmission information, or both of the transmission history and retransmission information according to the destination. Thus, the transmission information is protected according to the degree of sensitiveness of the destination.

According to the present invention, when it is determined that the predetermined condition is satisfied, the display of the transmission information relating to the destination to which the data is retransmitted is inhibited, whereby the leakage of the transmission information to the outside is prevented with the redial function (retransmission) made usable, resulting in that security can be enhanced.

According to the present invention, when it is determined that the predetermined condition is satisfied, the retransmission is inhibited, whereby the leakage of the transmission information to the outside is prevented to thereby further enhance security.

According to the present invention, when the data transmission is completed, it is determined that the predetermined condition is satisfied. Therefore, the leakage of the transmission information to the outside after the data transmission can be prevented with a user's convenience achieved.

According to the present invention, when a document from which data is obtained is removed from the document tray, it is determined that the predetermined condition is satisfied. Therefore, it is prevented that the transmission information can be found by a third party such as other user after the document is removed from the document tray by the user, while achieving user's convenience.

According to the present invention, when a user is away from the transmission apparatus, it is determined that the predetermined condition is satisfied. Therefore, it is prevented that the transmission information can be found by a third party after the user finishes the data transmission and away from the apparatus, while achieving user's convenience.

According to the present invention, when the number of times of retransmission exceeds the prescribed threshold value, it is determined that the predetermined condition is satisfied. Therefore, it is prevented that the transmission information can be found by a third party during the repeated retransmission process by limiting the number of times of the retransmission.

According to the present invention, the display of the transmission history and/or retransmission information is inhibited on the basis of the destination, whereby the transmission information can be protected according to the degree of sensitiveness of the destination.

The above and further objects and features of the invention will more fully be apparent from the following detailed description with accompanying drawings.

BRIEF DESCRIPTION OF THE SEVERAL VIEWS OF THE DRAWINGS

FIG. 7 is a schematic view showing one example of a display screen;

FIG. 8 is a schematic view showing one example of a display screen;

FIG. 9 is a schematic view showing one example of a display screen;

DETAILED DESCRIPTION OF THE INVENTION

Figure 1:
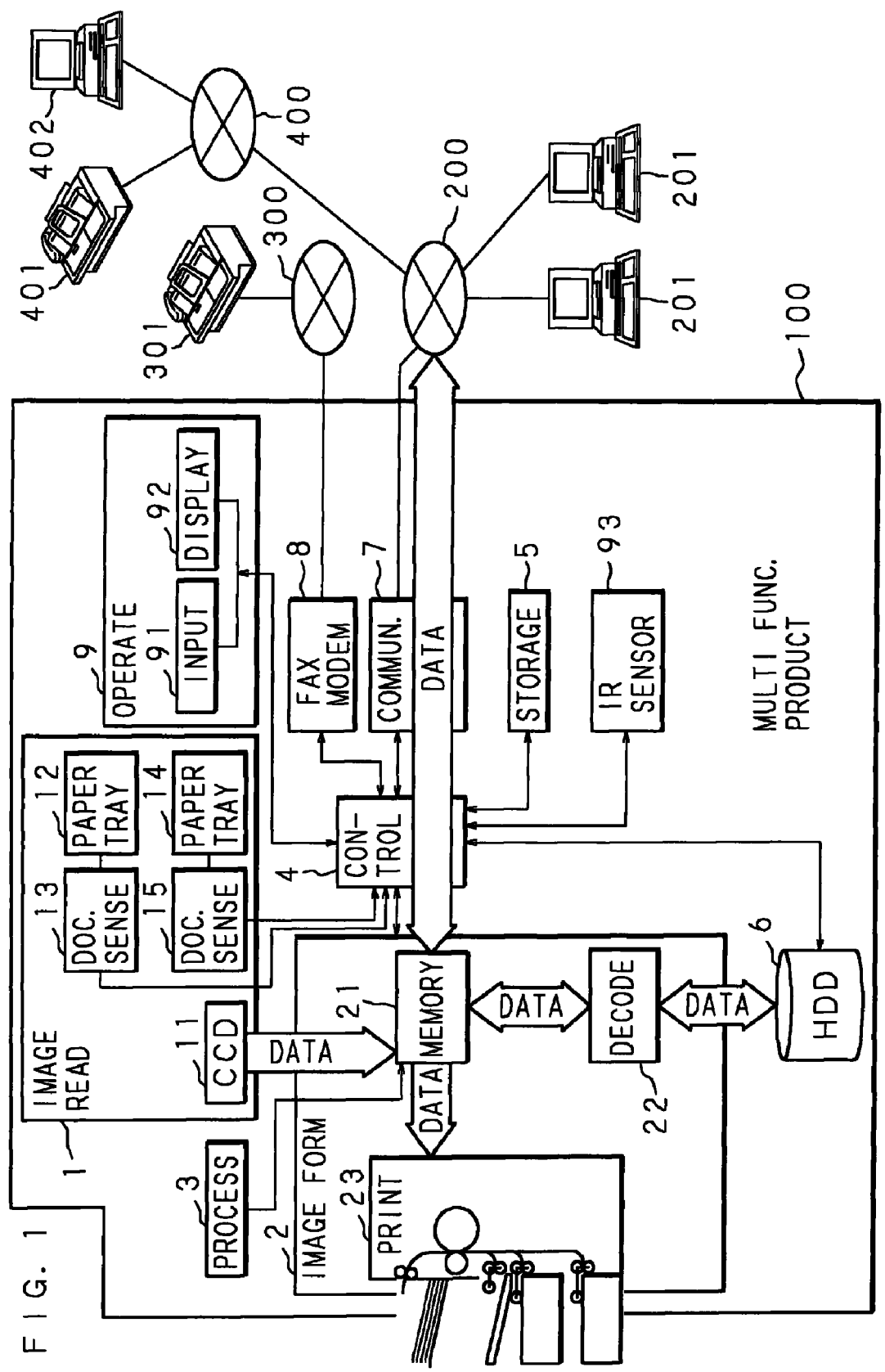
FIG. 1 is a block diagram showing an internal structure of a digital multifunctional machine.

A digital multifunctional machine provided with a transmission apparatus according to the present invention will be explained with reference to drawings illustrating an embodiment. FIG. 1 is a block diagram showing an internal structure of the digital multifunctional machine 100. As shown in the figure, the digital multifunctional machine 100 has an image reading section 1, image forming section 2, processing section 3, control section (controller) 4, storing section (storage) 5, HDD 6, communication section 7 (including a transmitter), FAX modem 8 (including a transmitter), and an operation section 9, and the like.

The image reading section 1 has a CCD 11, a sheet feed tray 12 on which a document is placed, a document sensor 13 that detects a document on the document tray 12, a sheet discharge tray 14 on which the document is discharged, and a document sensor 15 that detects the document on the sheet discharge tray 14. The image reading section 1 is, for example, an automatic document feeder (ADF), wherein it detects the document placed on the sheet feed tray 12 by the document sensor 13, irradiates light to the document that moves in a transporting path for transporting the document, converts the reflection light from the document into an analog signal by photoelectric conversion performed by the CCD 11, and converts the obtained analog signal into a digital signal at an A/D converter (not shown). The image reading section 1 outputs the digital signal obtained by the conversion to the image forming section 2. The document sensor 13 detects whether the document placed on the sheet feed tray 12 is removed or not. The read document is discharged onto the sheet discharge tray 14, and the document sensor 15 detects whether the document discharged onto the sheet discharge tray 14 is removed or not. The detection signals detected by the document sensors 13 and 15 are outputted to the control section 4.

The image forming section 2 has a memory 21, an encryption decoding section 22, printing section 23, and the like. The digital signal inputted from the image reading section 1 is temporarily stored in the memory 21 as image data. The image forming section 2 reads the stored image data. The read image data is subject to editing process such as density conversion process, magnification conversion process and Nin1 at the processing section 3, and then, the processed image data is outputted to the encryption decoding section 22.

The encryption decoding section 22 encrypts the image data with a predetermined system, and outputs the encrypted data to the HDD 6. The encryption decoding section 22 decodes the encrypted data inputted from the HDD 6 into original image data, and outputs the decoded image data to the memory 21.

The printing section 23 forms an image onto a sheet on the basis of the image data stored in the memory 21, and discharges the sheet having the image formed thereon. The printing section 23 has, for example, a photosensitive drum, a charger for charging the photosensitive drum to a predetermined potential, a laser writing device for forming an electrostatic latent image on the surface of the photosensitive drum, a developing device that supplies toner to the electrostatic latent image on the surface of the photosensitive drum in order to make the latent image visible, a transfer device that transfers the toner image on the surface of the photosensitive drum onto a sheet, and the like (all of these devices are not shown). The printing section 23 is not limited to an electrophotographic system, but any systems such as inkjet system, thermal transfer system can be employed.

The communication section 7 has an interface for performing communication (e.g., e-mail function, FTP, Internet FAX function) between a network 200 to which the digital multifunctional machine 100 is connected, terminal devices 201, 201 connected to the Internet 400, Internet FAX 401, and external personal computer 402. The communication section 7 transmits the image data read by the image reading section 1 or image data stored in the HDD 6 to the terminal devices 201, 201, Internet FAX 401, external personal computer 402, or the like. The communication section 7 (including a transmitter) has a retransmission function for repeating the transmission to the destination (other party) under the control of the control section 4.

The FAX modem 8 has incorporated therein an NCU and modem, and has a facsimile communication interface for performing a facsimile communication with a facsimile 301 (or unillustrated digital multifunctional machine) connected to a telephone line network 300 to which the digital multifunctional machine 100 is connected. The FAX modem 8 (including a transmitter) has a redial function, wherein, when the transmission to the destination (other party) is not completed, it dials again the same destination to repeat the communication with the facsimile 301 at the destination the preset number of times (e.g., five times) under the control of the control section 4. When the transmission is completed, the FAX modem 8 outputs a transmission completion signal to the control section 4, while when the transmission is not completed after the retransmission is performed predetermined number of times, outputs a transmission non-completion signal to the control section 4.

The operation section 9 is, for example, a touch-panel system, and includes an input section 91 that accepts an instruction for operation by a user, and a display section 92 composed of a liquid crystal display for displaying various pieces of information to the user.

The storing section (storage) 5 is made of a non-volatile memory or HDD. It stores authentication information for authenticating a user by associating ID and password of the user. Further, the storing section 5 stores destination management information for managing a phone number of a destination to which data represented by image data is transmitted, e-mail address, name of the destination, and the like, so as to correspond to the e-mail function, FTP function, FAX function, and the like.

Further, the storing section 5 stores history information (transmission history) in which FAX number of the destination, phone number, name of the destination, transmission date, content of the transmission, and the like are time-sequentially recorded, and redial information (retransmission information) recorded for every destination when the redial function is sued. The history information and redial information can be displayed at the display section 92 in order to enhance convenience for a user.

An infrared sensor 93 is attached to, for example, a housing of the digital multifunctional machine 100. When a user is away from the digital multifunctional machine 100 after making a desired operation at the digital multifunctional machine 100, the infrared sensor 93 detects this condition and outputs a detection signal to the control section 4.

The control section 4 is composed of a CPU and the like for controlling the overall processing of the digital multifunctional machine 100. When a user operates a data transmission or the like at the operation section 9, the control section 4 causes the display section 92 to display a screen for promoting the user to input an ID and password of the user, and authenticates the user according to whether or not the ID and password inputted at the input section 91 agree with those stored beforehand in the storing section 5.

When a condition set beforehand (e.g., when the transmission is completed, when a document is removed from the document tray, when a user is away from the digital multifunctional machine 100, when the redial is repeated more than predetermined number of times, etc.) is satisfied, the control section (controller) 4 inhibits the display of the history information and redial information stored at the storing section 5 on the display section 92, with the result that a user feels as if the history information and redial information are deleted. Considering the convenience for an administrator of the digital multifunctional machine 100, the history information and redial information can be displayed by inputting an ID and password for an administrator, for example. When the preset condition is satisfied, the use of the redial function can be inhibited, in addition to the inhibition of the display of the history information and redial information. This can prevent that a third party reads the history information and redial information stored in the storing section 5 by utilizing the redial function.

Figure 2:
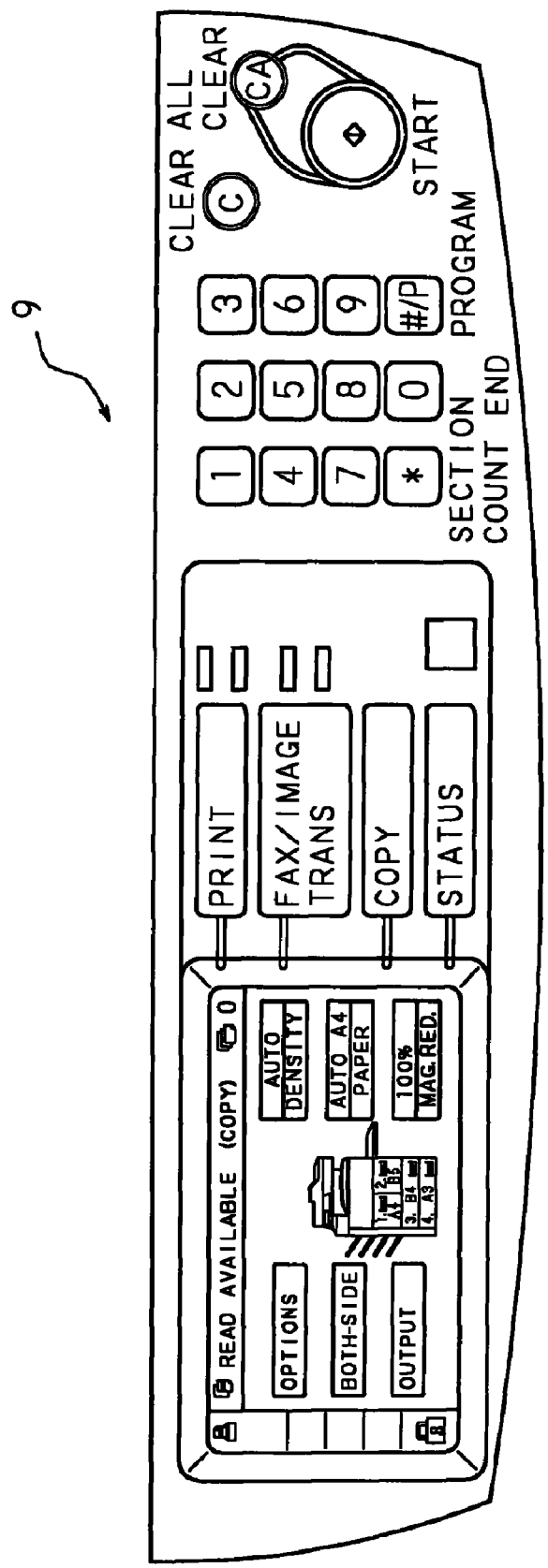
FIG. 2 is a schematic view showing an example of an operation panel of an operation section.

FIG. 2 is a schematic view showing an example of the operation panel at the operation section 9, and FIGS. 3 to 10 are schematic views showing one example of the display screen. As shown in FIG. 2, when a user reads image data from a document and transmits the read image data to a required other party, for example, the user operates a "FAX/image transmission" button and operates ten-key on the operation panel to input the user's ID and password, whereby user authentication is performed. The authentication of the user may be performed by using an IC card and the like having recorded thereon personal information instead of a system of inputting an ID and password from the operation panel.

Figure 3:
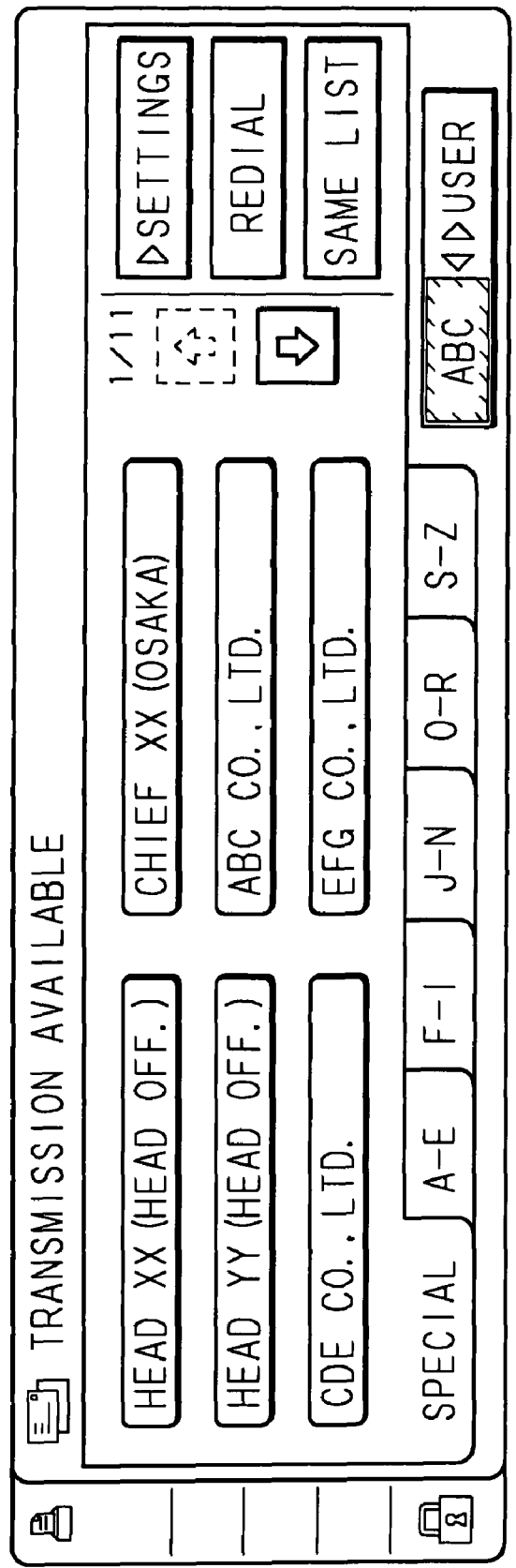
FIG. 3 is a schematic view showing one example of a display screen.

When the user authentication is completed, a screen for selecting the destination set beforehand is displayed as shown in FIG. 3. A required other party is selected among the displayed destinations, and the image data obtained by reading the document is transmitted. The image data can be redialed, by operating a redial button, from the transmission history to the other party to which transmission has once been made.

Figure 4:
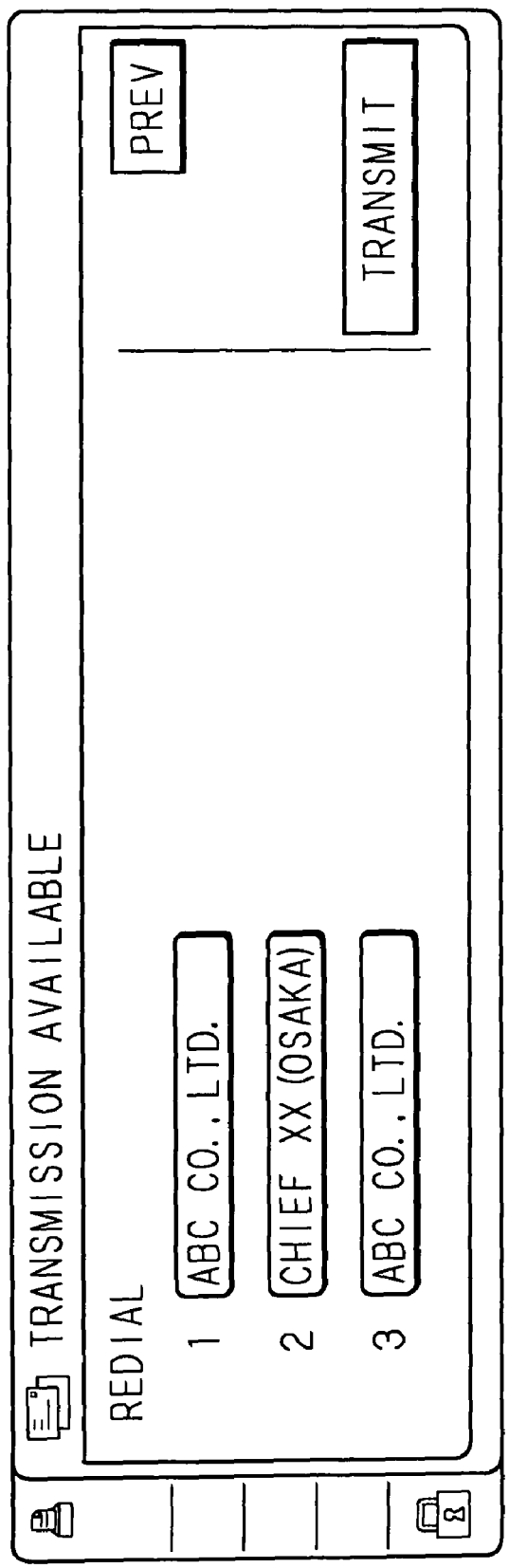
FIG. 4 is a schematic view showing one example of a display screen.

When the redial button is operated, the transmission history (e.g., "ABC Co., Ltd.", "xx chief (Osaka)", "ABC Co., Ltd.", or the like) is displayed as shown in FIG. 4, so that the user can set the destination from the displayed transmission history and make the redial transmission.

Figure 5:
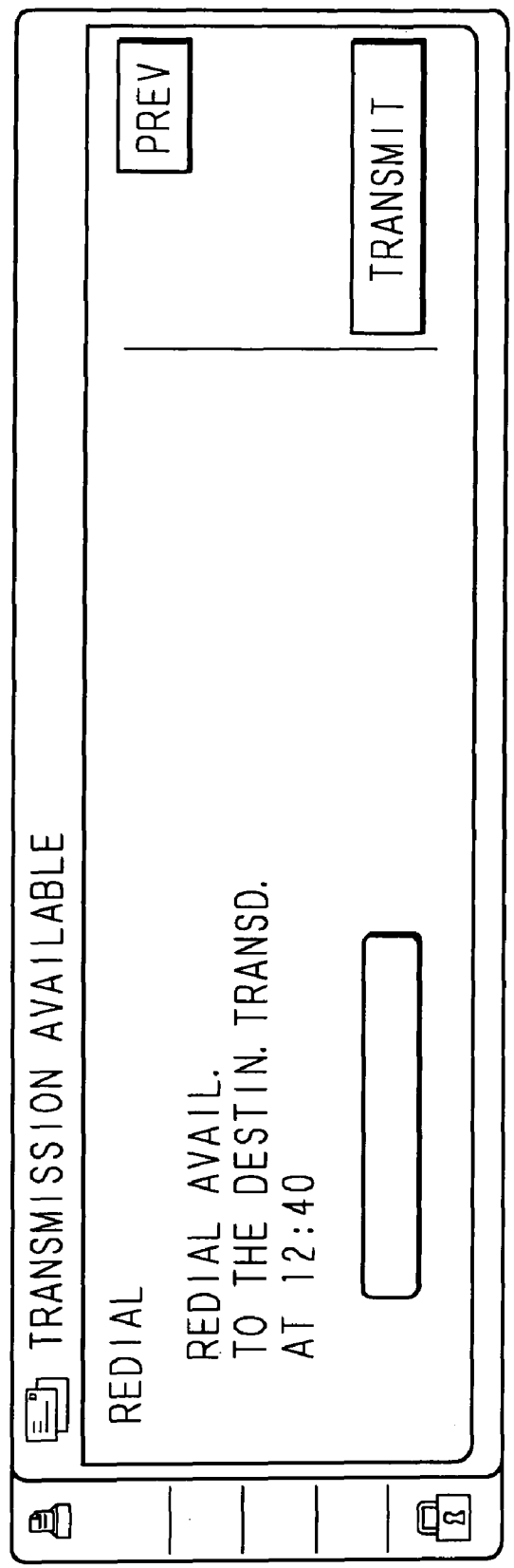
FIG. 5 is a schematic view showing one example of a display screen.

When the redial transmission is made, it is possible not to display the name of the destination on the screen but only to display the transmission time in order to cause the user to recognize the destination from the transmission time and to prevent the destination from being found by a third party, as shown in FIG. 5.

Figure 6:
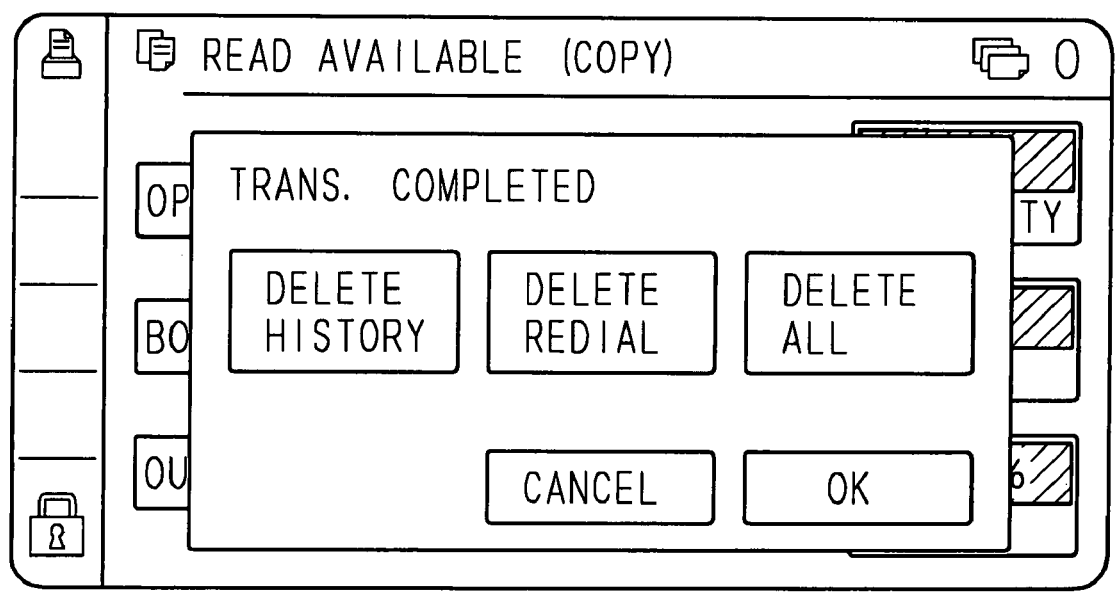
FIG. 6 is a schematic view showing one example of a display screen.

When the transmission of the image data is completed, a screen for promoting a user to select whether the history information, redial information, or both of them is deleted or not is displayed as shown in FIG. 6, and the process according to the selection by the user is performed. When the history information and redial information are deleted, an ordinary user cannot read these pieces of information after the deletion, but an administrator can read these pieces of information since they are stored in the storing section 5. The history information and redial information to be deleted correspond to the transmission process made by the user oneself.

By operating a "job state" button on the operation panel in FIG. 2, a job stand-by state, job completion state, or the like for each of FAX transmission and FAX reception can be displayed, for example. When a job completion state button of the FAX transmission is operated, the state of the job in which the transmission is completed is displayed as shown in FIG. 7. Examples of the displayed job state include a destination, processing time, number of pages, progression state, and the like. When it is set such that the destination is not displayed upon the completion of the transmission, the destination is deleted from the job list after the FAX transmission is completed. The destination may be displayed on the screen, or it may be blank in order not to display characters.

Figure 8:
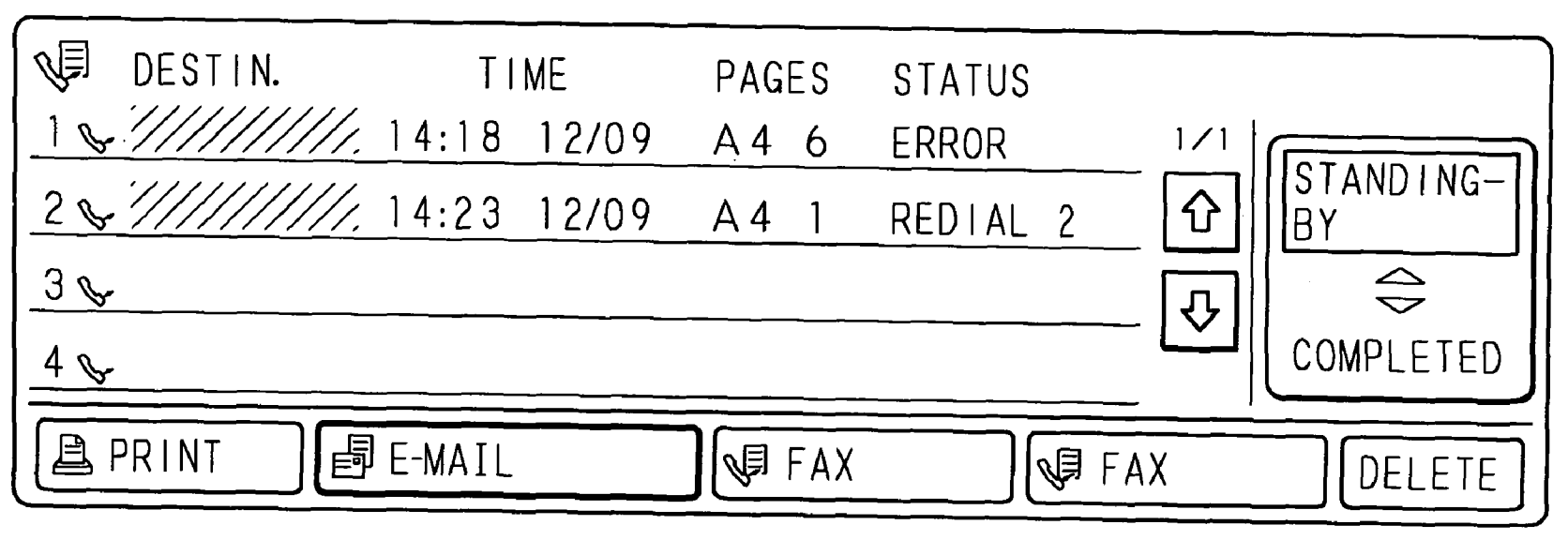

When a job stand-by button of the FAX transmission is operated, the job state in which the transmission is not completed is displayed as shown in FIG. 8. Examples of the displayed job state include a destination, processing time, number of pages, progressing state, and the like. As the progressing state, information such as transmission error, redial twice is displayed. Further, the stand-by job is selected and the delete button is operated, whereby the selected job is deleted. The destination may be displayed on the screen, or it may be blank in order not to display characters.

Figure 10:
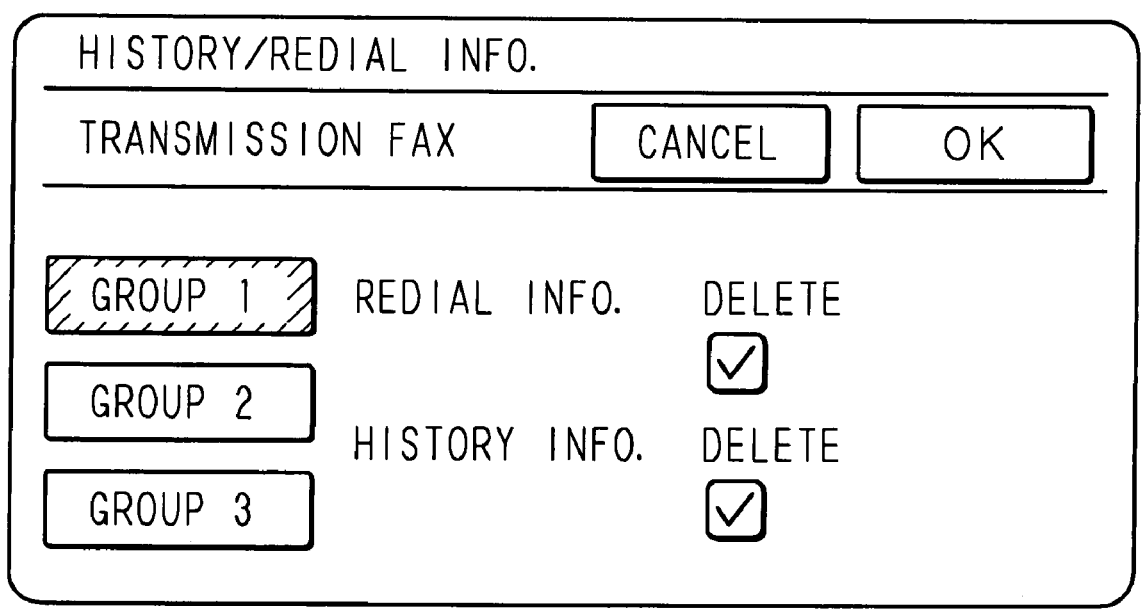
FIG. 10 is a schematic view showing one example of a display screen.

The history information, redial information or both of them can be set beforehand so as to associate with a destination (other party). As shown in FIG. 9, the addresses of the other party upon the FAX transmission are classified into groups, wherein each name of the other party such as "xx head (the head office)", "xx chief (Osaka)", "BCD Co., Ltd." is registered as a first group. The history information and redial information are set to be deleted for the first group as shown in FIG. 10, whereby, when image data is transmitted to the other party set as the first group, the history information and redial information are deleted. Either one of the history information and redial information may be deleted.

Figure 11:
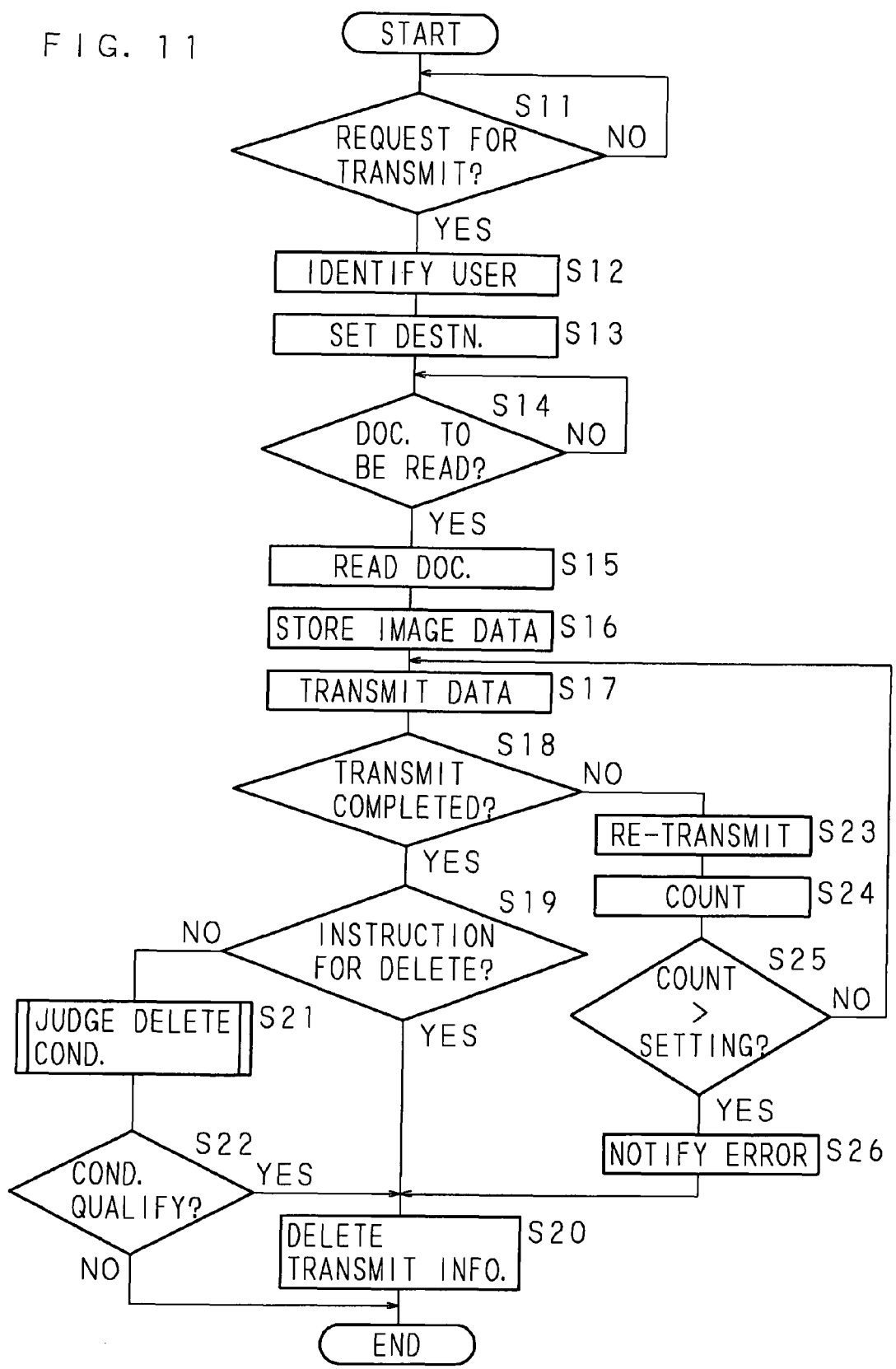
FIG. 11 is a flowchart showing a procedure of a process executed by the digital multifunctional machine.

Subsequently, the operation of the digital multifunctional machine 100 provided with the transmission apparatus according to the invention will be explained. FIG. 11 is a flowchart showing a procedure of a process executed by the digital multifunctional machine 100. The control section 4 determines whether there is a transmission command from the operation section 9 (S11). If there is no transmission command (NO at S11), the control section 4 continues the process at step S1, and waits until the transmission command is issued.

When there is a transmission command (YES at S11), the control section 4 performs a user authentication (S12), and sets a destination in accordance with the operation from the operation section 9 (S13). The control section 4 determines whether or not a document to be read is placed on the sheet feed tray 12 (S14). When the document to be read is not placed on the sheet feed tray (NO at S14), the control section 4 continues the process at step S14, and waits until a document is placed.

When there is a document to be read (YES at S14), the control section 4 reads the document (S15), stores image data obtained by reading the document (S16), and transmits the image data (S17). The control section 4 determines whether or not the transmission is completed (S18). When the transmission is completed (YES at S18), the control section 4 determines whether or not the instruction for deletion according to the operation from the operation section 9 is issued (S19). When there is the instruction for deletion (YES at S19), the control section 4 deletes the transmission information such as history information or redial information (S20), and ends the process.

When there is no instruction for deletion (NO at S19), the control section 4 makes the determination for the deletion condition (S21) so as to determine whether there is the deletion condition or not (S22). The process for the determination of the deletion condition will be described later. When there is the deletion condition (YES at S22), the control section 4 continues the process at step S20 and the following steps. When there is no deletion condition (NO at S22), the control section 4 ends the process.

When the transmission is not completed at step S18 (NO at S18), the control section 4 performs a retransmission process for retransmitting image data to the same destination by the redial function (S23), and counts the number of times of transmission (S24). The control section 4 determines whether the number of times of transmission is greater than a predetermined value or not (S25). If the number of times of transmission is greater than the predetermined value (YES at S25), it informs a transmission error with the use of the display section 92 (S26), and continues the process at step S20 and the following steps. When the number of times of transmission is not greater than the predetermined value (NO at S25), the control section 4 continues the process at step S17 and the following steps, thereby transmitting the image data.

Figure 12:
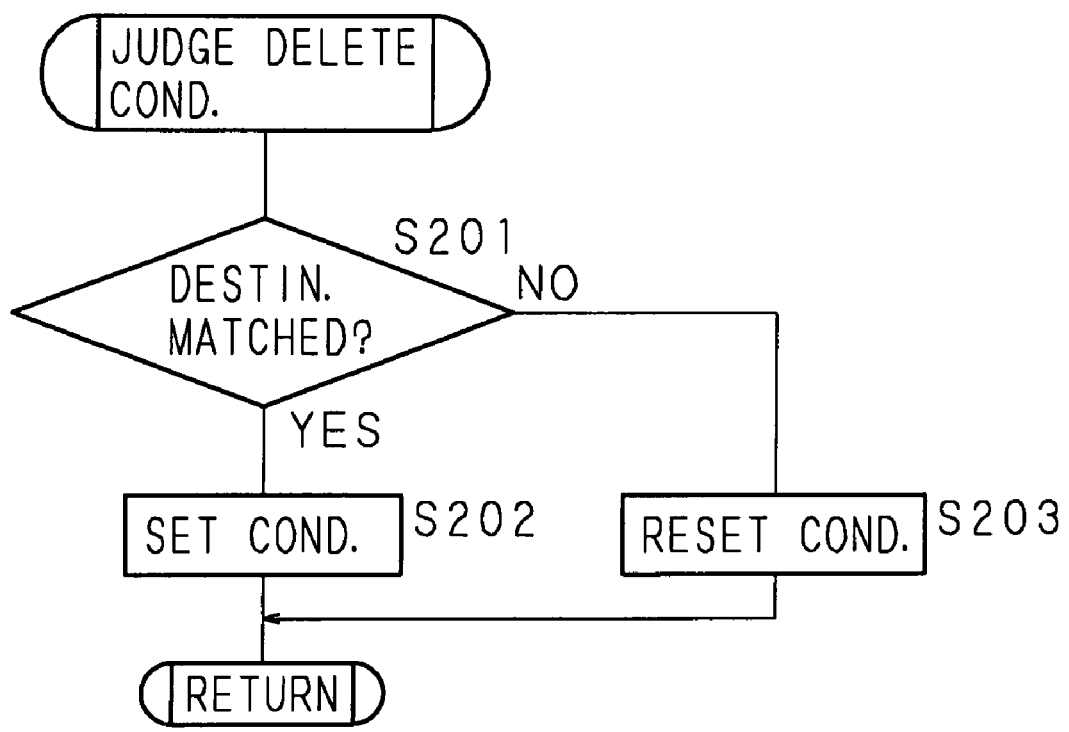
FIG. 12 is a flowchart showing a procedure of a deletion condition determining process.

FIGS. 12 to 15 are flowcharts showing a procedure of a deletion condition determination process. As shown in FIG. 12, the control section 4 determines whether or not the destination agrees with a predetermined destination set beforehand (S201). When the destination agrees with the predetermined destination (YES at S201), the control section 4 determines that there is the deletion condition (S202) so as to end the process. When the destination does not agree with the predetermined destination (NO at S201), the control section 4 determines that there is no deletion condition (S203) so as to end the process.

Figure 13:
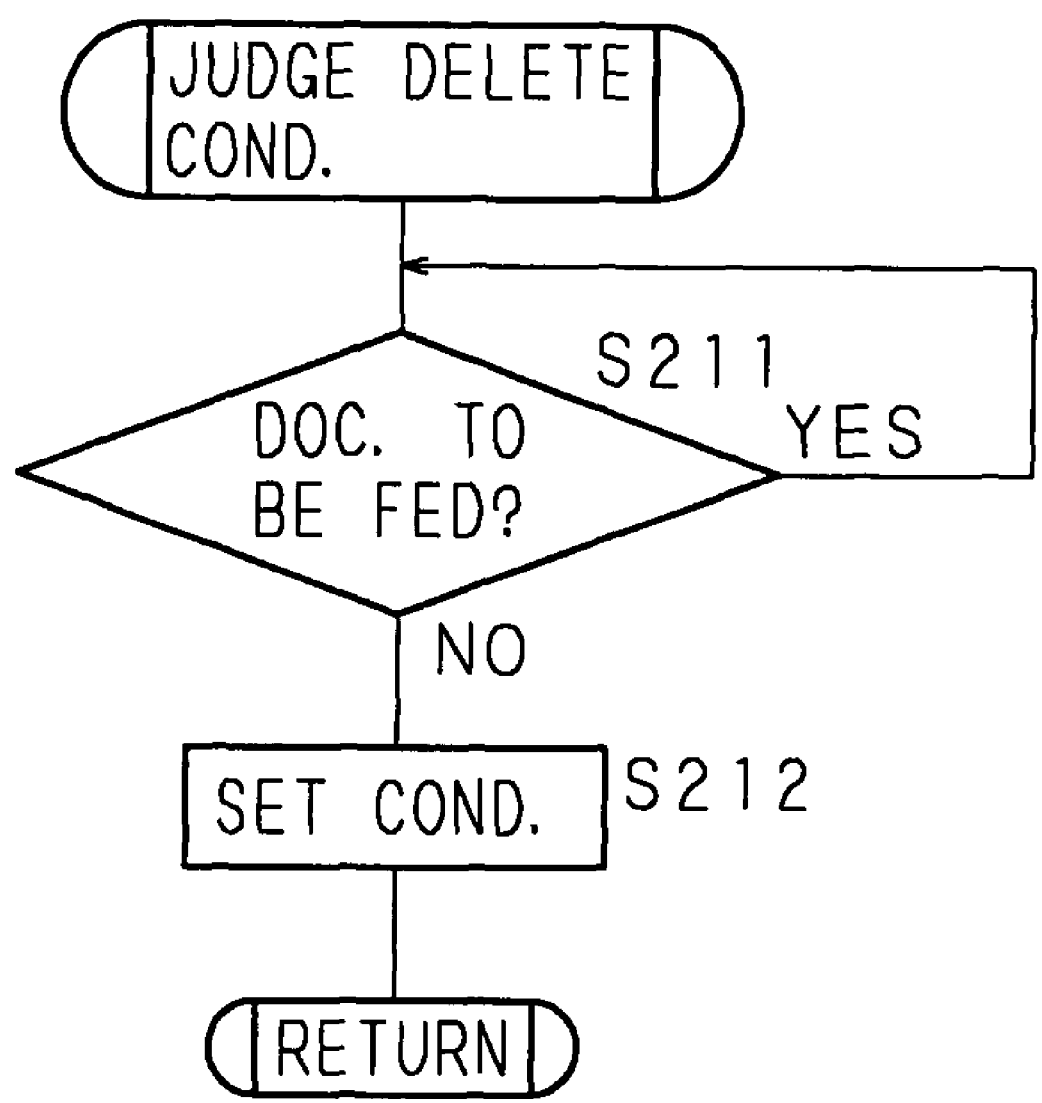
FIG. 13 is a flowchart showing a procedure of a deletion condition determining process.

As shown in FIG. 13, the control section 4 determines whether a document is placed on the sheet feed tray 12 or not (S211). When the document is placed on the sheet feed tray (YES at S211), the control section 4 continues the process at step S211 so as to wait until the document is removed from the sheet feed tray 12. When the document is not placed on the sheet feed tray 12 (NO at S211), the control section 4 determines that there is the deletion condition (S212) so as to end the process.

Figure 14:
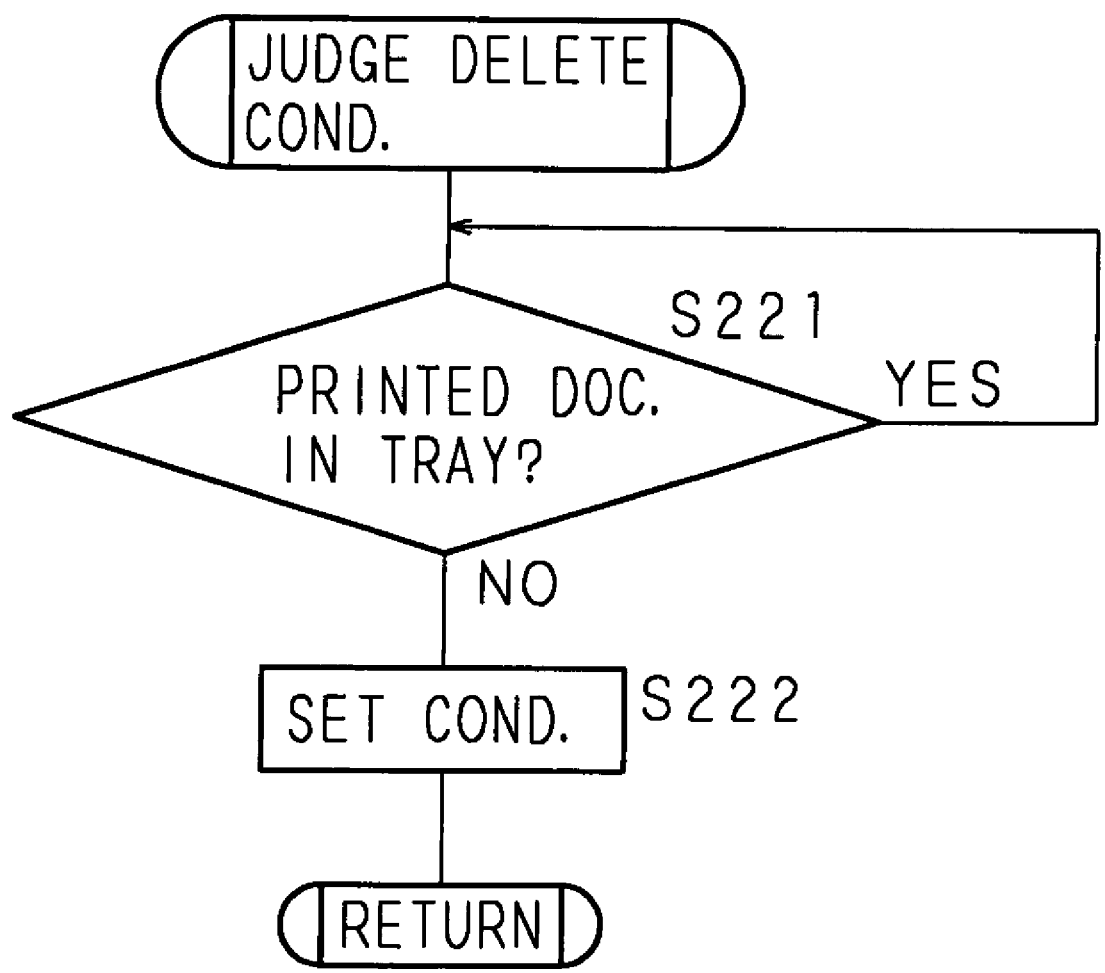
FIG. 14 is a flowchart showing a procedure of a deletion condition determining process.

As shown in FIG. 14, the control section 4 determines whether a document is placed on the sheet discharge tray 14 or not (S221). When the document is placed on the sheet discharge tray (YES at S221), the control section 4 continues the process at step S221 so as to wait until the document is removed from the sheet discharge tray 14. When the document is not placed on the sheet discharge tray 14 (NO at S221), the control section 4 determines that there is the deletion condition (S222) so as to end the process.

Figure 15:
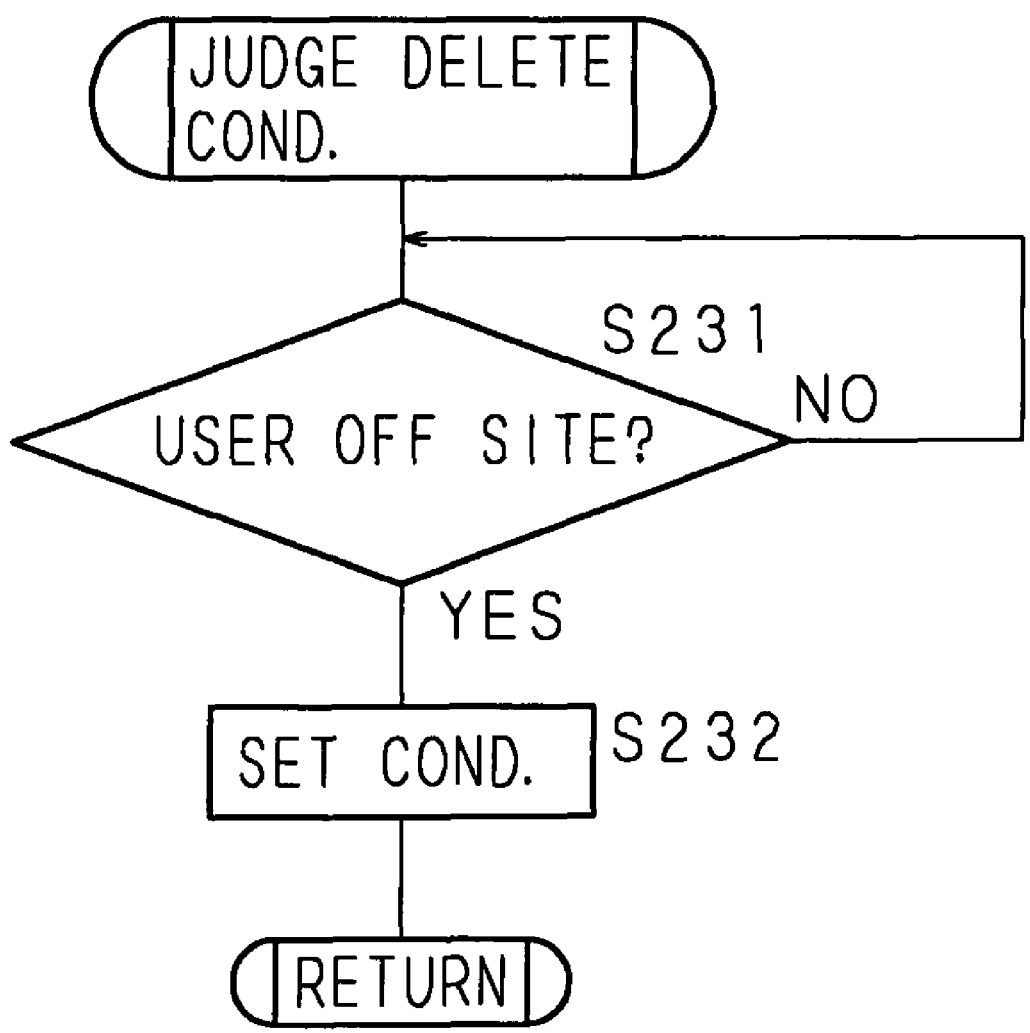
FIG. 15 is a flowchart showing a procedure of a deletion condition determining process.

As shown in FIG. 15, the control section 4 determines whether a user is away from the apparatus (digital multifunctional machine 100) or not (S231). When the user is not away from the apparatus (NO at S231), the control section 4 continues the process at step S231 so as to wait until the user is away from the apparatus. When the user is away from the apparatus (YES at S231), the control section 4 determines that there is the deletion condition (S232) so as to end the process. Any one of the deletion condition determination processes shown in FIGS. 12 to 15 can be used, or these processes may be used in combination.

As explained above, the present invention prevents the leakage of the transmission information to the outside, while making the redial function (retransmission) usable, thereby being capable of enhancing security. Further, the use of the redial function is inhibited, whereby security can further be enhanced. Moreover, a user's convenience is achieved, and the transmission information can be protected according to the degree of sensitiveness of the destination.

Although the aforesaid embodiment describes the digital multifunctional machine as an example, the application of the transmission apparatus according to the present invention is not limited to the digital multifunctional machine. For example, the transmission apparatus according to the present invention is applicable to an apparatus provided with a communication function such as a facsimile. Further, data to be transmitted is not limited to image data, but other data such as meta-data may be transmitted.

In the above-mentioned embodiment, the deletion of the transmission information is to inhibit the display on the display section 92. However, the transmission information such as the name of the other party may not at all be displayed, or the transmission information may be displayed with a symbol row such as an asterisk (*) in order that a user cannot recognize it.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

What is claimed is:

1. A transmission apparatus comprising:
a transmitter performing data transmission;
a storage storing destination information about a destination and address information about the destination, in association with each other;
a display displaying the destination information stored by the storage; and
a controller determining whether or not a predetermined condition is satisfied, wherein
the transmitter performs a data transmission based on address information associated with a selected destination information among destination information displayed by the display, and
the controller inhibits the display from displaying a destination information whose destination is determined to satisfy the predetermined condition among destination information on which the transmitter has performed the data transmission.

2. The transmission apparatus according to claim 1, wherein the controller determines that the condition is satisfied when data transmission is completed.

3. The transmission apparatus according to claim 1, further comprising:
a document tray having a document for obtaining data placed thereon or discharged thereonto; and
a sensor detecting whether or not a document is placed on the document tray;
wherein the controller determines that the condition is satisfied when the document is removed from the document tray.

4. The transmission apparatus according to claim 1, further comprising
a sensor detecting whether or not a person is present at a vicinity of the transmission apparatus,
wherein the controller determines that the condition is satisfied when a person is away from the transmission apparatus.

5. A transmission apparatus comprising:
a transmitter retransmitting data to a destination when data transmission is not completed;
a storage storing information about the destination;
a display displaying the information stored by the storage; and
a controller determining whether or not a predetermined condition is satisfied, wherein
the controller inhibits the display of the information by the display when it determines that the predetermined condition is satisfied, and
wherein the controller counts a number of times of retransmission, and determines that the condition is satisfied when the number of times exceeds a prescribed threshold value.

6. A transmission apparatus comprising:
a transmitter retransmitting data to a destination when data transmission is not completed;
a storage storing information about the destination;
a display displaying the information stored by the storage; and
a controller determining whether or not a predetermined condition is satisfied, wherein
the controller inhibits the display of the information by the display when it determines that the predetermined condition is satisfied, and
wherein
the information is about a transmission history or a destination when retransmission is made, and the controller inhibits the display of the information according to the destination.

7. A transmission apparatus comprising:
a transmitter performing data transmission;
a storage that stores destination information about a destination and address information about the destination, in association with each other;
a display that displays the destination information stored by the storage;
determining means for determining whether or not a predetermined condition is satisfied, and
inhibiting means for inhibiting the display from displaying a destination whose destination is determined to satisfy the predetermined condition among destination information on which the transmitter has performed the data transmission.

8. The transmission apparatus according to claim 7, wherein the determining means is configured to determine that the condition is satisfied when data transmission is completed.

9. A transmission method for storing destination information about a destination and address information about the destination, in association with each other, displaying the stored destination information, and retransmitting the data based on address information associated with a selected destination information associated with the selected destination among destination information displayed on the display when data transmission is not completed, comprising steps of:

determining a predetermined condition; and inhibiting the display from displaying a destination information whose destination is determined to satisfy the predetermined condition among destination information on which the transmitter has performed data transmission.

* * * * *